F. M. Buckles.
Two-way Rain Water Conductor.
Nº 92,155.  Patented Jul. 6, 1869.
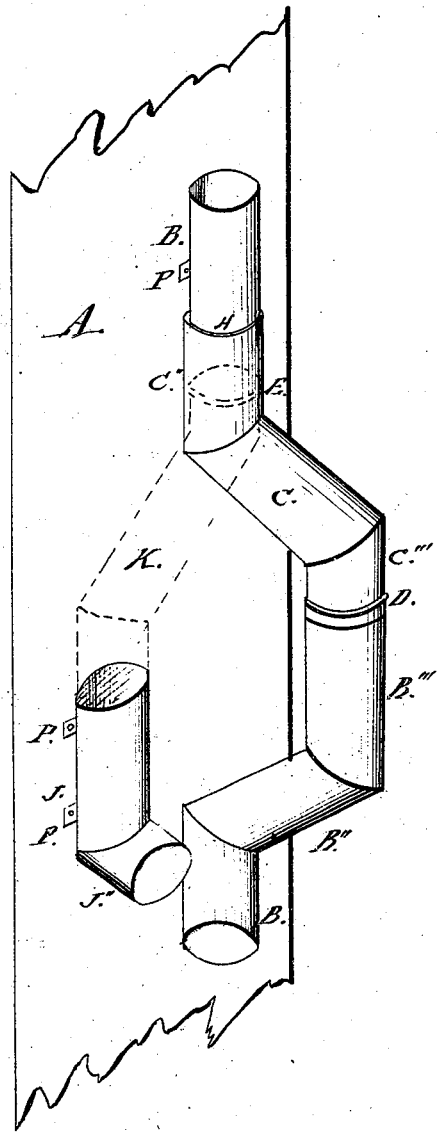
Witnesses:
Platt R. Richards
J. B. Marsh
Inventor:
Francis M. Buckles
per W. B. Richards
Atty

United States Patent Office.

FRANCIS M. BUCKLES, OF ALTONA, ILLINOIS, ASSIGNOR TO HIMSELF AND JOHN A. STUCKEY, OF SAME PLACE.

Letters Patent No. 92,155, dated July 6, 1869.

IMPROVEMENT IN TWO-WAY RAIN-WATER CONDUCTORS.

The Schedule referred to in these Letters Patent and making part of the same.

*To all whom it may concern:*

Be it known that I, FRANCIS M. BUCKLES, of Altona, in the county of Knox, and State of Illinois, have invented certain new and useful Improvements in Water-Feeders and Cut-Offs; and I do hereby declare that the following is a full, clear, and exact description of the same, reference being had to the accompanying drawings, making a portion of this specification, in which—

Figure 1 is a perspective view of the device, attached to a building.

Similar letters of reference indicate corresponding parts.

The nature of this invention relates to improvements in water-feeders and cut-offs for cisterns; and The invention consists in combining a curved joint in such a manner with an ordinary water-spout, as to admit of connecting or adjusting it easily, to either the spout leading into the cistern, or the one leading off from it.

To enable others to understand the construction and operation of my invention, I will proceed to describe it with reference to the drawings.

A represents a section of a house or other building.

B represents an ordinary cylindrical spout, attached by the clamps, P, to the building, and may be connected with the gutter at the upper end.

B″ represents an elbow or joint of the spout B, to which is attached another joint, B‴, in the direction, again, of the main spout B.

C represents the movable joint, with a joint, C″, at the upper end, parallel with and fitting over the spout B, and a joint, C‴, at its lower end, fitting into the spout B.

The upper joint, B, is provided with a collar, shown by the dotted lines E and the joint C″, and carries an annular ring inside, as shown by the dotted line H, which prevents the joint C from being drawn off the joint B by accident, in changing the movable joints.

D represents a collar on the joint C‴, to prevent it slipping, or passing too far into the joint B, or the joint J.

The joint B may communicate with the cistern or other receptacle for the water.

J represents a joint, also attached to the building by the clamps P, and having a joint, J″, attached as an elbow, and which may connect with spout or trough, or any other means for leading the water off.

The dotted lines K show the position of the movable joint C, when placed to lead the water off, and the position of the joint C, in the drawing, is for leading the water into the cistern.

What I claim as new, and desire to secure by Letters Patent, is—

The movable joint C C″ C‴, with collars H and D, when combined and operating with the joint B, the elbows B B″ B‴ and J J″, for changing the direction of the discharge from eaves, substantially as described, and for the purpose set forth.

Signed at Altona, Illinois, this 24th day of January, 1869.

FRANCIS M. BUCKLES.

Witnesses:
P. R. RICHARDS,
J. B. HARSH.